Figure 1:
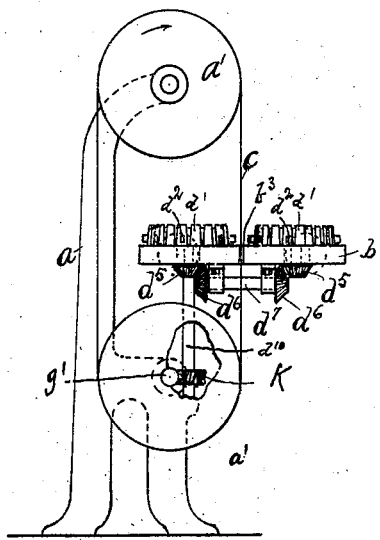

No. 857,332. PATENTED JUNE 18, 1907.
J. CUNNING.
MACHINE FOR SPLITTING PIGS' FEET.
APPLICATION FILED OCT. 11, 1904.

Witness
J. M. Teeter
R. Hamilton

Inventor
James Cunning
By
A. L. Teeter
Attorney

UNITED STATES PATENT OFFICE.

JAMES CUNNING, OF INDIANAPOLIS, INDIANA.

MACHINE FOR SPLITTING PIGS' FEET.

No. 857,332.   Specification of Letters Patent.   Patented June 18, 1907.

Application filed October 11, 1904. Serial No. 228,061.

*To all whom it may concern:*

Be it known that I, JAMES CUNNING, a citizen of the United States, residing at Indianapolis, in the county of Marion and State of Indiana, have invented certain new and useful Improvements in Machines for Splitting Pigs' Feet, set forth in the following specification and illustrated in the accompanying drawings, in which similar letters of reference throughout the different figures represent similar parts.

My invention relates to machines for splitting or cutting pigs' feet longitudinally in two parts by the use of a band saw cutting them through the cleft of the hoof, and having for its special objects that of safety to the operator, efficiency, and rapidity of the work and ease of operation, that the operator may place the pigs' feet in the moving channel-way provided by two parallel traveling chains mounted on the saw table and traveling in the same direction on each side of the saw; guide plates and spurs being provided on the links of each chain so that when corresponding spurs are traveling past the saw, pockets or divisions are formed in the said channel-way in which the pigs' feet are placed by the operator at a safe distance from the saw, and are carried beneath a pressure plate or guide so that they are presented properly to the saw without the attention of the attendant.

I have illustrated and specified my invention in the following specification and accompanying drawings, in the different views of which similar reference characters indicate similar parts.

Figure 2:
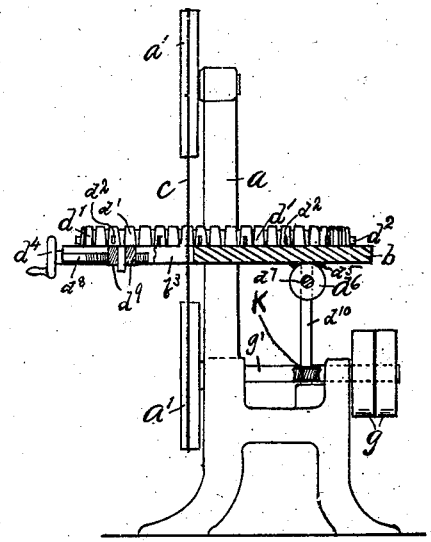
Figure 3:
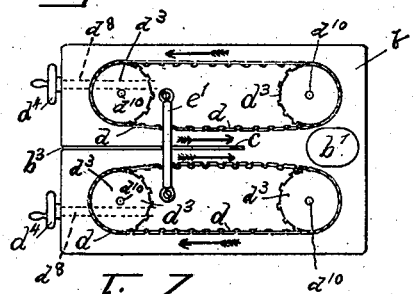
Figure 4:
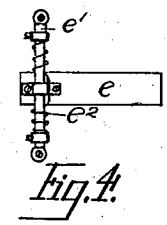
Figure 5:
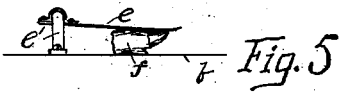
Figure 6:
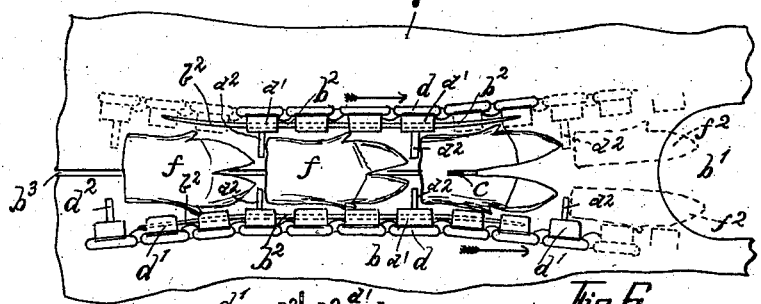
Figure 7:
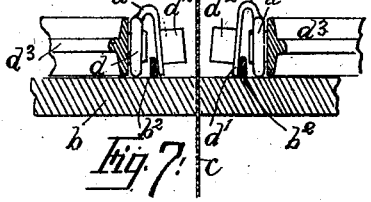

In the drawings Figure 1 is a front elevation of the complete device; Fig. 2 is a side elevation partly in section; Fig. 3 is a plan view of the table detached and the chains mounted thereon; Fig. 4 is a plan view of the pressure plate detached; Fig. 5 is a side view of the same; Fig. 6 is an enlarged broken plan view, detached, of the feeding chains. Fig. 7 is an enlarged broken and partly sectional end view of the table, chains and guides.

In the drawings $a$ represents an ordinary frame or stand on which are mounted rotative straight rimmed wheels $a'$, preferably covered at the rim with leather or some yielding material to protect the band saw $c$ carried thereby; $b$ is the table through which the saw passes down on the cutting side, through the center thereof, an opening $b^3$ being preferably provided at the middle of the table that the saw may be readily removed; at $b^1$ is provided an ample opening through which the split product may fall from the table; $d$, $d$, are feeding chains mounted on opposite sides of the saw on the saw table, being carried and driven by sprocket wheels $d^3$ spaced apart on the table, and with hand wheels $d^4$ connected to screws $d^8$ engaging with sleeves $d^9$ in which the shafts or studs of the sprocket wheels $d^3$ are mounted, to adjust the chains as desired. The shafts $d^{10}$ of said sprocket wheels are provided with bevel gears $d^5$ with which bevel gears $d^6$ on a cross shaft $d^7$ engage, one of the shafts $d^{10}$ extending downwardly and provided with a worm gear K engaging with a worm pinion on the drive shaft $g'$ of the lower band pulleys $a'$. The shaft $g'$ is adapted to be operated in any suitable manner, and for the purpose of illustration drive pulleys $g$ are shown. By this means it will be obvious that when motion is imparted to the shaft $g'$ for operating the band-saw $c$, motion will likewise be imparted in the opposite direction to the chains $d$, as indicated by the arrows in Figs. 3 and 6.

Each link of the chains $d$ is provided with an arching projection $d'$, and a certain predetermined number of these projections are provided with laterally extending feed spurs $d^2$, the spurs being spaced apart to correspond to the lengths of the pigs' feet, as illustrated in Fig. 6. Attached to the table are inwardly curving plates $b^2$ over which the arching projections $d'$ of the links $d$ of the chains are operated, and by means of which the inner sides of the chains are deflected, or caused to travel in inwardly curving courses, to form guide ways which constantly decrease in width toward the saw and then constantly increase in width after they pass the saw. By this means the insertion of the pigs' feet is facilitated and the labor reduced, as will be obvious. Swinging upon a rod $e'$ above the inner sides of the chains $d$ is a pressure plate $e$, the plate being spring supported as at $e^2$, and bearing yieldably upon the pigs' feet represented at $f$, as they are carried beneath the plate by the chains. The plate $e$ thus serves to retain the pigs' feet in place, and prevents their displacement during the operation of the saw. In operation the said pressure plate presses on the foot to be cut in two as seen in Fig. 4. The parts of the foot when cut in two are represented at $f^2$ Fig. 6.

It is evident that in the application of my invention a number of variations may be resorted to without departing from my invention, and I desire it understood that I hold myself at liberty to make it in all such variations as fall fairly within the spirit and scope of my invention and What I desire to secure by Letters Patent, is:—

1. In a device of the character described, a table, a band-saw operating through said table, endless chains spaced apart and arranged to travel upon opposite sides of said band-saw parallel with the cutting plane thereof, means carried by said chains for feeding the material between them and against the saw, and means for causing the inner sides of said chains to approach and recede from said saw.

2. In a device of the character described, the combination with suitable supports carrying a band-saw and operating mechanism therefor, of a table provided with an aperture to receive said band-saw, endless conveyers formed of connected links arranged on each side of said band-saw and operated by the band-saw mechanism, said endless conveyers having an arched member extending from each link, and means carried by said table for regulating the distance between said conveyers.

3. In a machine of the class described, a table, a band-saw operating through said table, an endless chain on each side of the saw and traveling across the table and adapted to feed the material to the saw, a spring pressure plate adapted to yieldably bear on the material as it passes beneath the plate, and laterally projecting spurs extending from each chain and spaced at uniform distances to feed the material to the saw and to deliver the severed parts from the saw.

4. In a device of the class described, a table, a band-saw operating through said table, endless chains spaced apart and arranged to travel upon opposite sides of said band-saw parallel with the cutting plane thereof, the links of said chains provided with arching projections and with a plurality of said projections provided with lateral feeding spurs, and inwardly curving plates carried by said table and over which said arching projections are adapted to pass to cause the inner sides of the chains to travel in courses toward the saw at one side and away from the saw at the other side.

5. In a device of the class described, a table, a band-saw operating through said table, endless chains spaced apart and arranged to travel upon opposite sides of said band-saw parallel with the cutting plane thereof, the links of said chains provided with arching projections and with a plurality of said projections provided with lateral feeding spurs, inwardly curving plates carried by said table and over which said arching projections are adapted to pass to cause the inner sides of the chains to travel in courses toward the saw at one side and away from the saw at the other side, and a spring pressed pressure plate arranged between said chains and in advance of the saw and adapted to yieldably press upon the material passing beneath it.

Signed this 12 day of August 1904.

JAMES CUNNING.

Witnesses:
E. F. BURROWS.
JAS. N. DUNCAN.